(12) United States Patent
Guo et al.

(10) Patent No.: US 12,294,241 B2
(45) Date of Patent: May 6, 2025

(54) STATOR CORE, MAGNETIC LEVITATION BEARING, AND MOTOR

(71) Applicant: GREE ELECTRIC APPLIANCES, INC. OF ZHUHAI, Zhuhai (CN)

(72) Inventors: Weilin Guo, Zhuhai (CN); Gao Gong, Zhuhai (CN); Fang Zhang, Zhuhai (CN); Xin Li, Zhuhai (CN); Zhehao Deng, Zhuhai (CN); Jianhui Wang, Zhuhai (CN)

(73) Assignee: GREE ELECTRIC APPLIANCES, INC. OF ZHUHAI, Zhuhai (CN)

( * ) Notice: Subject to any disclaimer, the term of this patent is extended or adjusted under 35 U.S.C. 154(b) by 199 days.

(21) Appl. No.: 18/158,150

(22) Filed: Jan. 23, 2023

(65) Prior Publication Data
US 2023/0155429 A1   May 18, 2023
US 2023/0352991 A9   Nov. 2, 2023

Related U.S. Application Data

(63) Continuation of application No. PCT/CN2021/093064, filed on May 11, 2021.

(30) Foreign Application Priority Data

Aug. 20, 2020 (CN) .......................... 202010842317.5

(51) Int. Cl.
H02K 1/14        (2006.01)
(52) U.S. Cl.
CPC ......... H02K 1/146 (2013.01); *H02K 2213/03* (2013.01)
(58) Field of Classification Search
CPC .. B25H 1/0014; F16C 2380/26; F16C 32/047; F16C 32/048; F16C 32/0497;
(Continued)

(56) References Cited

U.S. PATENT DOCUMENTS 3,845,997 A * 11/1974 Boden ...................... H02K 7/09
                                                              310/90.5
5,635,782 A    6/1997 Jacobsen et al.
(Continued)

FOREIGN PATENT DOCUMENTS

CN          201925346 U      8/2011
CN          102891545 A      1/2013
(Continued)

OTHER PUBLICATIONS

JP-2019080399-A, Kitamora et al., all pages (Year: 2019).*
(Continued)

*Primary Examiner* — Naishadh N Desai
(74) *Attorney, Agent, or Firm* — Christensen O'Connor Johnson Kindness PLLC

(57) ABSTRACT

The present disclosure provides a stator core, a magnetic levitation bearing, and a motor. The stator core is used in the magnetic levitation bearing and includes an annual yoke. The annular yoke has an inner circumferential wall and an outer circumferential wall, a plurality of pole pillars are disposed on the inner circumferential wall, and each of the plurality of pole pillars extends towards an axis of the inner circumferential wall, there is a distance D between an axis of the outer circumferential wall and the axis of the inner circumferential wall, and D≠0 is satisfied. According to the stator core, the magnetic levitation bearing, and the motor of the present disclosure, the stator core has a non-centrosymmetric structure, so that a cross-sectional area of a magnetic path in some region of the stator core is increased, which is beneficial to an improvement of an output force of the magnetic levitation bearing.

9 Claims, 3 Drawing Sheets

(58) Field of Classification Search
CPC ...... H02K 1/146; H02K 2213/03; H02K 7/09; Y10S 435/897
See application file for complete search history.

(56) References Cited

U.S. PATENT DOCUMENTS

| | | | |
|---|---|---|---|
| 6,794,780 | B2 | 9/2004 | Silber et al. |
| 2001/0022480 | A1 | 9/2001 | Johann et al. |
| 2017/0179802 | A1* | 6/2017 | Fujisue ................... F25B 13/00 |

FOREIGN PATENT DOCUMENTS

| | | | | | |
|---|---|---|---|---|---|
| CN | 106464046 | A | | 2/2017 | |
| CN | 107005115 | A | | 8/2017 | |
| CN | 108286569 | A | | 7/2018 | |
| CN | 208835970 | U | | 5/2019 | |
| CN | 111425523 | A | | 7/2020 | |
| CN | 112003391 | A | | 11/2020 | |
| JP | 2000083333 | A | | 3/2000 | |
| JP | 2018183021 | A | * | 11/2018 | ............ H04W 88/02 |
| JP | 2019080399 | A | * | 5/2019 | |
| JP | 2020162348 | A | | 10/2020 | |

OTHER PUBLICATIONS

JP-2018183021-A, Hirano et al., all pages (Year: 2018).*
European Search Report mailed Jan. 24, 2024, issued in International Application No. PCT/CN2021/093064, filed May 11, 2021, 46 pages.
International Search Report mailed Jul. 30, 2021, issued in corresponding International Application No. PCT/CN2021/093064, filed May 11, 2021, 2 pages.

* cited by examiner

STATOR CORE, MAGNETIC LEVITATION BEARING, AND MOTOR

CROSS-REFERENCE TO RELATED APPLICATION

The present application is a continuation application of International Application No. PCT/CN2021/093064, filed on May 11, 2021, which claims the priority of the Chinese patent application No. 202010842317.5, filed with China National Intellectual Property Administration on Aug. 20, 2020, and entitled "STATOR CORE, MAGNETIC LEVITATION BEARING, AND MOTOR", the entire contents of which are incorporated herein by reference.

TECHNICAL FIELD

The present disclosure belongs to the technical field of magnetic levitation bearings, and in particular relates to a stator core, a magnetic levitation bearing, and a motor.

BACKGROUND

In the related art, a stator core 1' of an active radial magnetic levitation bearing has a structure symmetrically arranged from top to bottom and from left to right. In general, the active radial magnetic levitation bearing has N poles (i.e., N teeth and N slots), the number N of the poles is: N=8, 16, 32, etc. The radial winding coils 2' are evenly distributed on and wound on the pole pillars 3' of the stator core 1' of the radial bearing, respectively, and coil turns thereof are the same. In the radial magnetic levitation bearing, each magnetic pole generates an electromagnetic force on each freedom degree by means of the coil current. The generated electromagnetic force is mainly used to overcome the gravity of the rotor 4' and adjust the radial displacement of the rotor 4'. The output force of the upper-half magnetic pole of the radial magnetic levitation bearing is greater than that of the lower-half magnetic pole, and the excess electromagnetic forces offset against each other, so that the radial winding coil 2' needs to generate a greater unilateral magnetic force by means of a greater current to overcome the rotor gravity, thus resulting in a relatively large volume and a relatively large power consumption thereof. Specifically, it is mainly the electromagnetic attraction force of the upper-half part of the bearing that overcomes the gravity of the radial magnetic levitation bearing, and the resultant force of the upper-half part is greater than the resultant electromagnetic force of the lower-half part. In the case of a symmetrical structure, it is necessary to increase the coil turn or increase the current to increase the output force, which causes the volume and the power consumption of the magnetic levitation bearing to be greater.

SUMMARY

Therefore, the technical problem to be solved by the present disclosure is to provide a stator core, a magnetic levitation bearing, and a motor. The stator core has a non-centrosymmetric structure, so that a cross-sectional area of a magnetic path in some region of the stator core is increased, which is beneficial to an improvement of an output force of the magnetic levitation bearing.

In order to solve the problems above, the present disclosure provides a stator core used in a magnetic levitation bearing and including an annual yoke. The annular yoke has an inner circumferential wall and an outer circumferential wall, a plurality of pole pillars are disposed on the inner circumferential wall, and each of the plurality of pole pillars extends towards an axis of the inner circumferential wall, and there is a distance D between an axis of the outer circumferential wall and the axis of the inner circumferential wall, and D≠0 is satisfied.

In some embodiments, in a projection of the annular yoke projected on any radial plane of the annular yoke, the inner circumferential wall has a circle center O, the outer circumferential wall has a circle center S, the distance D is a distance between the circle center O and the circle center S, and the stator core is symmetrical with respect to a straight line OS connecting the circle center O and the circle center S.

In some embodiments, a straight line passing through the circle center O and perpendicular to the straight line OS is a first straight line, the first straight line divides the annual yoke into a first yoke part and a second yoke part, and an area $A_1$ of the first yoke part is greater than an area $A_2$ of the second yoke part.

In some embodiments, $1.2A_2 \leq A_1 \leq 6A_2$ is satisfied.

In some embodiments, in the projection of the annular yoke projected on any radial plane of the annular yoke, $$\frac{R-r}{11} \leq D \leq \frac{5(R-r)}{7}$$

is satisfied, where R denotes a radius of the outer circumferential wall, and r denotes a radius of the inner circumferential wall.

In some embodiments, a circumferential width $W_1$ of each of pole pillars on the first yoke part is greater than a circumferential width $W_2$ of each of pole pillars on the second yoke part.

In some embodiments, $1.2W_2 \leq W_1 \leq 6W_2$ is satisfied.

In some embodiments, the pole pillars on the first yoke part are symmetrical with respect to a straight line OS; $H_1$ denotes a distance between an intersection of the straight line OS and the inner circumferential wall and an intersection of the straight line OS and the outer circumferential wall; the distance $H_1$ and the pole pillars on the first yoke part are located at the same side of the first straight line, and $W_1=H_1$ is satisfied; and/or the pole pillars on the second yoke part are symmetrical with respect to the straight line OS, and $H_2$ denotes a distance between an intersection of the straight line OS and the outer circumferential wall and an intersection of the straight line OS and the inner circumferential wall, and the distance $H_2$ and the pole pillars on the second yoke part are located at the same side of the first straight line, and $W_2=H_2$ is satisfied.

The present disclosure further discloses a magnetic levitation bearing, including the stator core above.

The present disclosure further discloses a motor, including the magnetic levitation bearing above.

According to the stator core, the magnetic levitation bearing, and the motor of the present disclosure, the stator core has the non-centrosymmetric structure, so that the output force of the magnetic levitation bearing corresponding to the region whose magnetic path with the relatively large cross-sectional area is increased. Moreover, the stator core meets the requirement that the working current is relatively small while the bearing provides the output force, thereby greatly improving the reliability and stability of the magnetic levitation bearing during operation, greatly reducing the loss of silicon steel sheets, reducing the cost, and reducing the weight of the bearing, and the reliability of the magnetic levitation bearing system may also be improved.

Figure 1:
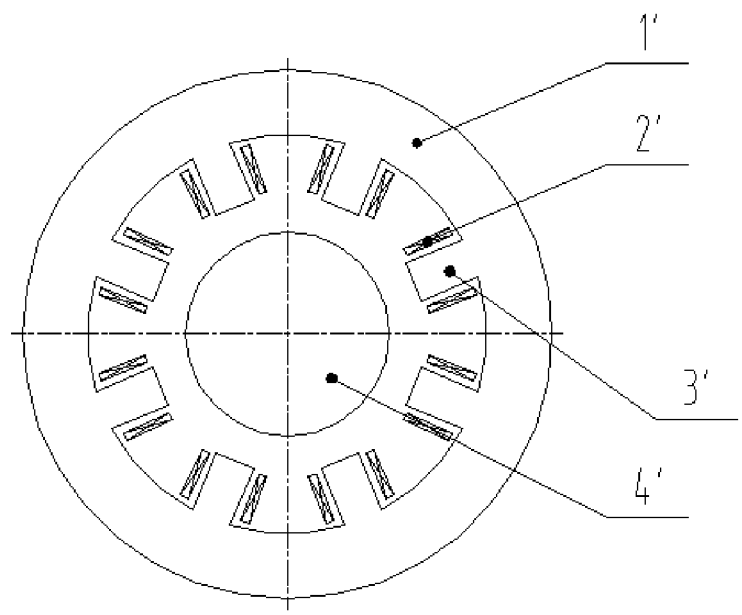
FIG. 1 is a schematic structural view showing a radial magnetic levitation bearing in the related art.

REFERENCE NUMERALS ARE INDICATED AS 10. annular yoke; 101. inner circumferential wall; 102. outer circumferential wall; 103. first straight line; 104. first yoke part; 105. second yoke part; 20. pole pillar; 30. winding coil; 40. rotor; 1'. stator core; 2'. winding coil; 3'. pole pillar; 4'. rotor.

DETAILED DESCRIPTION OF THE EMBODIMENTS

Figure 2:
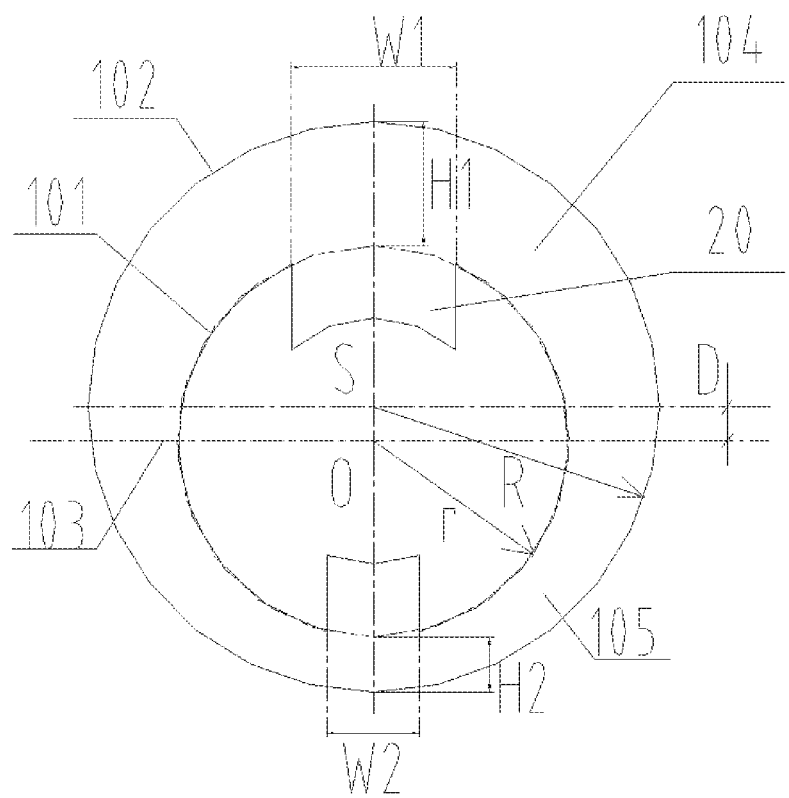
FIG. 2 is a schematic structural view showing a stator core of an embodiment of the present disclosure.
Figure 3:
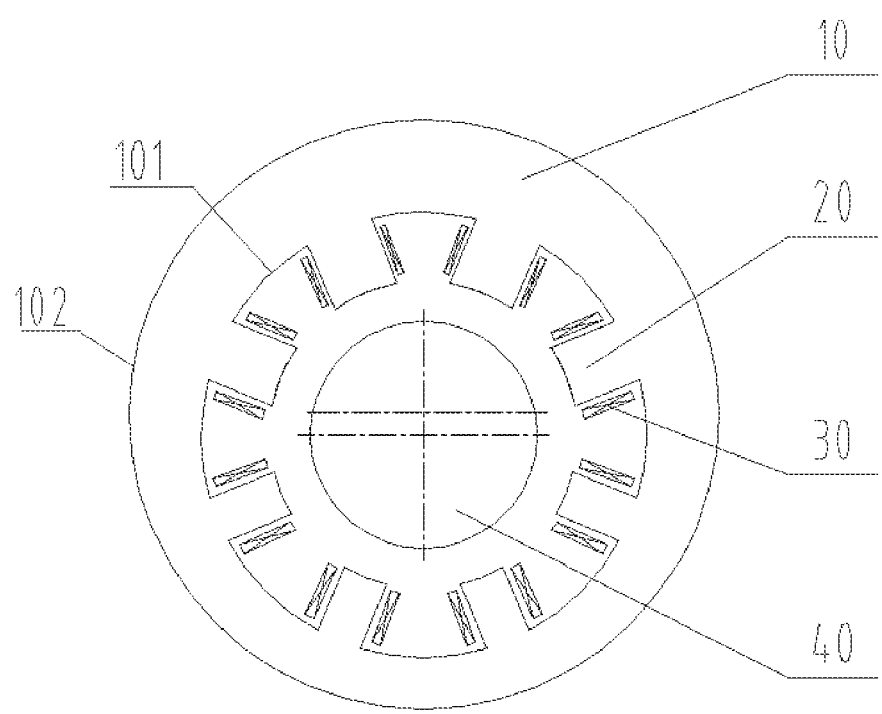
FIG. 3 is a schematic structural view showing a magnetic levitation bearing of an embodiment of the present disclosure.

Referring to FIGS. 1 to 3, an embodiment of the present disclosure provides a stator core used in a radial magnetic levitation bearing. The stator core includes an annular yoke 10. The annual yoke 10 has an inner circumferential wall 101 and an outer circumferential wall 102. A plurality of pole pillars 20 are disposed on the inner circumferential wall 101, and each of the pole pillars extends towards the axis of the inner circumferential wall 101. There is a distance D between the axis of the outer circumferential wall 102 and the axis of the inner circumferential wall 101, where D≠0, that is, the axis of the outer circumferential wall 102 and the axis of the inner circumferential wall 101 do not coincide, and there is an offset distance therebetween. In this case, it will objectively lead to a difference between radial thicknesses of the annular yoke in the related art. That is, the radial thickness of some part of the annular yoke 10 is relatively thick, while the radial thickness of some part of the annular yoke 10 is relatively thin. Specifically, the stator core with two similar pole pillars 20 is shown in FIG. 2, and the radial thickness of the upper yoke part is greater than the radial thickness of the lower yoke part, such that the cross-sectional area of the magnetic path in one region of the stator core is greater than that of the magnetic path in another region of the stator core. That is, compared with the stator core with a symmetrical structure in the related art, the stator core of the present disclosure has a non-centrosymmetric structure, and the output force of the magnetic levitation bearing corresponding to the region with a greater cross-sectional area of the magnetic path is increased. Moreover, the stator core of the present disclosure meets the requirement for the relatively small working current while meeting the requirement for the output force of the bearing, thereby greatly improving the reliability and stability of the magnetic levitation bearing during operation, greatly reducing the loss of silicon steel sheets, reducing the cost, and reducing the weight of the bearing, and the reliability of the magnetic levitation bearing system may also be improved.

In some embodiments, in a projection of the annular yoke 10 projected on any radial plane thereof, the inner circumferential wall 101 has a circle center O, the outer circumferential wall 102 has a circle center S, and the distance D is a distance between the circle center O and the circle center S. The stator core is symmetrical with reference to the straight line OS connecting the circle center O and the circle center S, and in this case, the stator core is of mirror symmetry with reference to the straight line OS, which ensures that while the output force of some region of the magnetic levitation bearing is increased, the control difficulty of the magnetic levitation bearing is reduced as well.

In some embodiments, a straight line passing through the circle center O and perpendicular to the straight line OS is a first straight line 103, and the first straight line 103 divides the annual yoke 10 into a first yoke part 104 and a second yoke part 105. An area A/of the first yoke part 104 is greater than an area $A_2$ of the second yoke part 105. In the projection of the annular yoke 10 projected on any radial plane thereof, R denotes a radius of the outer circumferential wall 102, and r denotes a radius of the inner circumferential wall 101. An optimal range for $A_1$ and $A_2$ is obtained based on theoretical foundations as follows.

The electromagnetic force generated by the radial magnetic levitation bearing is:

$$F = \frac{\mu_0 N^2 A i^2}{4x^2} \qquad \text{Formula (1)}$$

$\mu_0$ denotes air permeability, N denotes the coil turn, A denotes the cross-sectional area of the magnetic path of the stator core, i denotes a current of the coil, x denotes a length of an air gap. A depends on a cross-sectional area of an outer ring (namely, the annual yoke) of the stator core and cross-sectional areas of the pole pillars. When the coil turn is constant, the electromagnetic force is directly proportional to the coil current and the cross-sectional area of the magnetic path, and is inversely proportional to a square of the length of the air gap. The electromagnetic force of the bearing is mainly used to overcome the gravity and adjust a radial displacement of the rotor. Supposing that $F_1$ denotes an upwards vertical resultant force of the electromagnetic forces of the bearing, and $F_2$ denotes a downwards vertical resultant force of the electromagnetic forces, and an adjustment force is a times of the gravity and mainly includes a possible disturbance force and a centrifugal force generated due to a disequilibrium of the rotor itself during a rotation of the rotor, and a is in a range of 0.1 to 20, then $$F_1 = (a+1) \times (mg)$$

$$F_2 = a \times (mg) \qquad \text{Formula (2)}$$

The relationship among the cross-sectional area $A_1$ of an upper magnetic path, the cross-sectional area $A_2$ of a lower magnetic path, and the electromagnetic forces $F_1$ and $F_2$ is:

$$\frac{A_1}{A_2} = \frac{F_1}{F_2} = \frac{a+1}{a}. \qquad \text{Formula (3)}$$

Then $$A_1 = \left(1 + \frac{1}{a}\right) A_2 \qquad \text{Formula (4)}$$

$$A_2 < A_1 < 11 A_2.$$

As shown in FIGS. 2 and 3, in the solutions of the present disclosure, the cross-sectional area of the magnetic path is changed by adjusting the structure of the annular yoke 10 and the pole pillars 20 of the stator core of the radial bearing, thereby changing the electromagnetic force generated by the stator of the bearing. The annular yoke 10 of the stator core is shown in FIG. 3. The width of each part of the annular yoke 10 may be changed by changing the distance D (wherein 0<D<R−r) between the circle centers of the inner circumferential wall 101 and the outer circumferential wall 102 of the annular yoke 10, wherein the width of the upper-half part of the outer ring of the stator core is approximate L=R−r+D, and the width of the lower-half part is approximate l=R−r−D, so that the cross-sectional area of the magnetic path of the stator core is changed, which may be realized when the formula (4) is satisfied.

Considering coil winding and the output force of the bearing, when the adjustment force is 0.2 to 5 times of the gravity, namely $0.2 \leq a \leq 5$, the bearing structure is optimum and the performance is optimal, and the area of the upper-half part of the outer ring of the stator core is 1.2 to 6 times of the area of the lower-half part, namely $1.2A_2 \leq A_1 \leq 6A_2$.

$$1.2 \leq \frac{A_1}{A_2} \approx \frac{R-r+D}{R-r-D} \leq 6 \qquad \text{Formula (5)}$$

Namely, $$\frac{R-r}{11} \leq D \leq \frac{5(R-r)}{7} \qquad \text{Formula (6)}$$

When the distance D between the two circle centers is within a range of the formula (6), the bearing has an optimal structure.

The circumferential width of the pole pillar 20 at each position is consistent with a corresponding radial thickness of the annual yoke 10. When the performance is optimal, a width of the pole pillar of the upper-half part of the stator core is 1.2 to 6 times of a width of the pole pillar of the lower-half part. That is, a circumferential width $W_1$ of the pole pillar 20 on the first yoke part 104 is greater than a circumferential width $W_2$ of the pole pillar 20 on the second yoke part 105, and $1.2W_2 \leq W_1 \leq 6W_2$ is satisfied.

In some embodiments, the pole pillars 20 on the first yoke part 104 are symmetrical with respect to the straight line OS, and $H_1$ denotes a distance between an intersection of the straight line OS and the inner circumferential wall 101 and an intersection of the straight line OS and the outer circumferential wall 102, and the distance $H_1$ and the pole pillar 20 on the first yoke part 104 are located at the same side of the first straight line 103, and $W_1 = H_1$. And/or, the pole pillars 20 on the second yoke part 105 are symmetrical with respect to the straight line OS, and $H_2$ denotes a distance between the intersection of the straight line OS and the outer circumferential wall 102 and the intersection of the straight line OS and the inner circumferential wall 101, and the distance $H_2$ and the pole pillar 20 on the second yoke part 105 are located at the same side of the first straight line 103, and $W_2 = H_2$. That is, the circumferential width of the pole pillar 20 is the same as a radial thickness of the yoke part at the corresponding position, so as to ensure better performance of the formed magnetic levitation bearing.

As shown in FIG. 3, the present disclosure further provides a magnetic levitation bearing, including the stator core above, winding coils 30 wound around the pole pillars 20 respectively, and a rotor 40 located in an inner hole of the stator core.

The present disclosure also provides a motor including the magnetic levitation bearing above.

It may be easily understood by those skilled in the art that, on the premise of no conflict, the above preferable embodiments may be freely combined and superimposed.

The above embodiments are merely some embodiments of the present disclosure, but not intended to limit the present disclosure. Any modifications, equivalent variations and improvements made within the spirit and principles of the present disclosure should be included within the protection scope of the present disclosure.

What is claimed is:

1. A stator core, used in a magnetic levitation bearing, comprising an annual yoke, wherein:
   the annular yoke has an inner circumferential wall and an outer circumferential wall;
   a plurality of pole pillars are disposed on the inner circumferential wall, and each of the plurality of pole pillars extends towards an axis of the inner circumferential wall;
   there is a distance D between an axis of the outer circumferential wall and the axis of the inner circumferential wall, and D≠0 is satisfied;
   in a projection of the annular yoke projected on any radial plane of the annular yoke, the inner circumferential wall has a circle center (O), the outer circumferential wall has a circle center(S), the distance D is a distance between the circle center (O) and the circle center(S), and the stator core is symmetrical with respect to a straight line (OS) connecting the circle center (O) and the circle center(S);
   a straight line passing through the circle center (O) and perpendicular to the straight line (OS) is a first straight line, the first straight line divides the annual yoke into a first yoke part and a second yoke part, and an area $A_1$ of the first yoke part is greater than an area $A_2$ of the second yoke part; and
   a circumferential width $W_1$ of each of pole pillars on the first yoke part is greater than a circumferential width $W_2$ of each of pole pillars on the second yoke part.

2. The stator core according to claim 1, wherein $1.2A_2 \leq A_1 \leq 6A_2$ is satisfied.

3. The stator core according to claim 2, wherein in the projection of the annular yoke projected on any radial plane of the annular yoke, $$\frac{R-r}{11} \leq D \leq \frac{5(R-r)}{7}$$

is satisfied, wherein R denotes a radius of the outer circumferential wall, and r denotes a radius of the inner circumferential wall.

4. The stator core according to claim 1, wherein $1.2W_2 \leq W_1 \leq 6W_2$ is satisfied.

5. The stator core according to claim 1, wherein:
   the pole pillars on the first yoke part are symmetrical with respect to a straight line (OS); $H_1$ denotes a distance between an intersection of the straight line (OS) and the inner circumferential wall and an intersection of the straight line (OS) and the outer circumferential wall; the distance $H_1$ and the pole pillars on the first yoke part are located at the same side of the first straight line, and $W_1 = H_1$ is satisfied.

6. The stator core according to claim 1, wherein:
the pole pillars on the second yoke part are symmetrical with respect to the straight line (OS), and $H_2$ denotes a distance between an intersection of the straight line (OS) and the outer circumferential wall and an intersection of the straight line (OS) and the inner circumferential wall and the distance $H_2$ and the pole pillars on the second yoke part are located at the same side of the first straight line, and $W_2=H_2$ is satisfied.

7. The stator core according to claim 5, wherein:
the pole pillars on the second yoke part are symmetrical with respect to the straight line (OS), and $H_2$ denotes a distance between an intersection of the straight line (OS) and the outer circumferential wall and an intersection of the straight line (OS) and the inner circumferential wall and the distance $H_2$ and the pole pillars on the second yoke part are located at the same side of the first straight line, and $W_2=H_2$ is satisfied.

8. A magnetic levitation bearing, comprising the stator core of claim 1.

9. A motor, comprising the magnetic levitation bearing of claim 8.

* * * * *